United States Patent
Moumen et al.

(10) Patent No.: US 10,178,734 B1
(45) Date of Patent: Jan. 8, 2019

(54) INDIVIDUAL LED SHORT CIRCUIT DETECTION

(71) Applicant: Valeo North America, Inc., Troy, MI (US)

(72) Inventors: Monji Moumen, Seymour, IN (US); Sylvain Larribe, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/881,891

(22) Filed: Jan. 29, 2018

(51) Int. Cl.
*H05B 37/02* (2006.01)
*H05B 33/08* (2006.01)

(52) U.S. Cl.
CPC ......... *H05B 33/089* (2013.01); *H05B 33/083* (2013.01); *H05B 33/0815* (2013.01); *H05B 33/0845* (2013.01)

(58) Field of Classification Search
CPC ............ H05B 33/0815; H05B 33/0845; B60C 1/1423; B60C 1/1461; B60C 11/005
USPC ................. 315/77, 82, 185 R, 291
See application file for complete search history.

(56) References Cited

U.S. PATENT DOCUMENTS

| | | | |
|---|---|---|---|
| 2007/0159750 A1 | 7/2007 | Peker et al. | |
| 2013/0221978 A1* | 8/2013 | Liao | H05B 33/0827 324/537 |
| 2014/0361696 A1* | 12/2014 | Siessegger | H05B 33/0803 315/186 |
| 2014/0368798 A1* | 12/2014 | Gyoten | G03B 21/2053 353/85 |
| 2015/0173133 A1* | 6/2015 | Seki | H05B 33/0818 315/185 R |
| 2017/0079103 A1* | 3/2017 | Niles | H05B 33/0827 |
| 2017/0331272 A1* | 11/2017 | Nakatani | H05B 33/0884 |
| 2018/0049301 A1* | 2/2018 | Brombach | H05B 37/0254 |

* cited by examiner

*Primary Examiner* — Tung X Le
(74) *Attorney, Agent, or Firm* — Oblon, McClelland, Maier & Neustadt, L.L.P.

(57) ABSTRACT

An LED lighting circuit for detecting individual LED failure, including a lighting unit including a plurality of LEDs connected in series, and a plurality of LED sensors each associated with a respective one of the LEDs. Also included is a lighting unit status signal generator coupled to the plurality of LED sensors configured to provide a status signal indicating a fault when any individual LED is short circuited.

12 Claims, 3 Drawing Sheets

INDIVIDUAL LED SHORT CIRCUIT DETECTION

BACKGROUND

Field of the Invention

This invention relates to vehicle lighting systems, and more particularly to vehicle lighting modules that utilize light emitting diode (LED) units.

Background of the Invention

As is well known, vehicles contain numerous types of lighting devices. For example, exterior vehicle lighting devices that perform a stop light function, tail lamp function, head lamp function, daytime running light function, dynamic bending light function, and a fog light function are common. In recent years, a number of vehicle manufacturers have begun using light-emitting diodes (LEDs) in an effort to meet desired lighting performance, reduce power and provide improved aesthetic characteristics.

In an effort to reduce traffic accidents, most governments provide safety regulations that specify vehicle lighting performance requirements. For example, Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In some cases, to be compliant with vehicle lighting regulations, LED lighting units for a vehicle turn off entirely if one of multiple LEDs in the lighting unit is in failure.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

(1) An LED lighting circuit for detecting individual LED failure, including a lighting unit including a plurality of LEDs connected in series, and a plurality of LED sensors each associated with a respective one of the LEDs. Also included is a lighting unit status signal generator coupled to the plurality of LED sensors configured to provide a status signal indicating a fault when any individual LED is short circuited.

(2) The LED lighting circuit of aspect (1), wherein the lighting unit status signal generator is configured to implement a logic OR function on inputs from the plurality of LEDs to generate the status signal indicating a fault when any individual LED is short circuited.

(3) The LED lighting circuit of aspect (2), wherein each of the plurality of LED sensors includes a switch configured to change states when a fault occurs on a respective one of the LEDs associated with the LED sensor.

(4) The LED lighting circuit of aspect (3), wherein the switches of the plurality of LED sensors are arranged in parallel to each other.

(5) The LED lighting circuit of aspect (1), wherein the lighting unit status signal generator is configured to implement a logic AND function on inputs from the plurality of LEDs to generate the status signal indicating a fault when any individual LED is short circuited.

(6) The LED lighting circuit of aspect (5), wherein each of the plurality of LED sensors includes a current source configured to change states when a fault occurs on a respective one of the LEDs associated with the LED sensor.

(7) The LED lighting circuit of aspect (6), wherein the current sources of the plurality of LED sensors are arranged in series with each other to form a current path from an LED voltage source to a ground.

(8) The LED lighting circuit of aspect (1), wherein each of the plurality of LED sensors includes a bipolar transistor.

(9) The LED lighting circuit of aspect (8), wherein the bipolar transistors of the plurality of LED sensors are arranged parallel to one another in an OR configuration.

(10) The LED lighting circuit of aspect (9), wherein each of the bipolar transistors is ON when all of the plurality of LEDs have a normal operating status, and the LED lighting unit status signal generator outputs a LOW status signal indicating a normal status of the LED lighting unit.

(11) The LED lighting circuit of aspect (10), wherein each of the bipolar transistors is configured to switch OFF when an LED associated with the transistor becomes short circuited, and the LED lighting unit status signal generator outputs a HIGH status signal indicating a fault status of the LED lighting unit.

(12) The LED lighting circuit of aspect (8), wherein the bipolar transistors of the plurality of LED sensors are arranged in series to one another in an AND configuration.

(13) The LED lighting circuit of aspect (12), wherein each of the bipolar transistors is ON when all of the plurality of LEDs have a normal operating status, and the LED lighting unit status signal generator outputs a LOW status signal indicating a normal status of the LED lighting unit.

(14) The LED lighting circuit of aspect (13), wherein each of the bipolar transistors is configured to switch OFF when an LED associated with the transistor becomes short circuited, and the LED lighting unit status signal generator outputs a HIGH status signal indicating a fault status of the LED lighting unit.

(15) An exterior vehicle lighting device including the LED lighting circuit of Claim aspect 910.

(16) A motor vehicle including a lighting device provided on an exterior of the motor vehicle, the lighting device including the LED lighting circuit of aspect (1).

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Embodiments described herein provide lighting modules having one or more solid state light sources. As used herein, a solid state light source refers to a type of light source using an electroluminescence phenomenon in which a material emits light in response to passage of an electric current or in response to a strong electric field. Examples of light sources include, but are not limited to semiconductor light-emitting diodes (LEDs), organic light-emitting diodes (OLEDs), polymer light-emitting diodes (PLEDs), and monolithic light-emitting diodes (MLEDs). Lighting modules described herein can also include one or more bulb sources, such as a halogen light source or a high intensity discharge (HID) light source.

As noted above, in some cases, to be compliant with vehicle lighting regulations, LED lighting units for a vehicle must turn off entirely if one of multiple LEDs in the lighting unit is in failure. This function is easily implemented for an open LED failure by use of series connected LEDs in an LED lighting unit, wherein open failure of any LED removes a current source for all LEDs in the unit. The inventors recognized, however, that simple series connection of the LEDs is insufficient to turn off the lighting unit upon shorting of a single LED because the short circuited LED still provides a current path for the remaining LEDs. For this, each LED has to be monitored individually.

Figure 1:
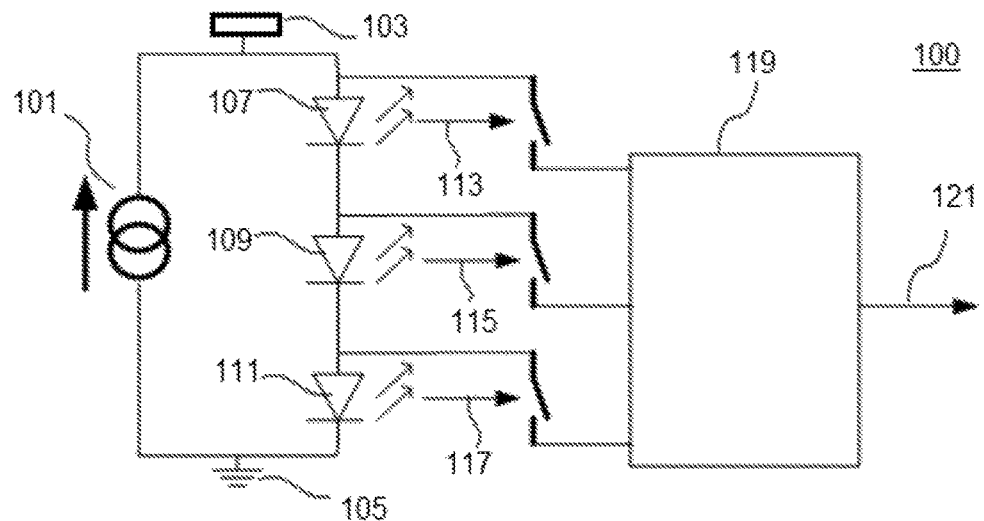
FIG. 1 illustrates a functional block diagram of an individual LED short circuit detection circuit implemented by an OR logic function according to one embodiment.

FIG. 1 illustrates a block diagram of an individual LED short circuit detection circuit implemented by an OR logic function according to one embodiment. As seen, the circuit 100 includes a current source 101 which provides current to an LED unit which includes LEDs 107, 109 and 111. More specifically, LEDs 107, 109, 111 are series connected with the anode of LED 107 connected to an LED voltage 103 and the cathode of LED 111 connected to ground 105. LEDs 107, 109 and 111 are associated with individual LED sensors 113, 115 and 117 respectively. In the embodiment of FIG. 1, the LED sensors 113, 115 and 117 are each schematically represented by a sense arrow coupled to a switch. Outputs from the LED sensors 113, 115, 117 are coupled to LED status detector 119 which implements a logic OR function to provide a signal on status output 121 representative of an operational status of the LED unit. The status detector 119 is capable of detecting a short circuit of any individual LED within the LED unit.

In the embodiment of FIG. 1, the detector output 121 will transition if any LED 107, 109 or 1 fails by a short circuit from the LED's cathode to anode. FIG. 1 shows the lighting circuit 100 in normal operation. Specifically, when the LEDs 107, 109 and 111 are all operating normally (neither open nor short circuited), their respective sensors 113, 115 and 117 each act as an open switch, and thus all inputs to the detector 119 are a logic LOW, for example. In this example, the status detector 119 implements a logic OR function to output a LOW value at status output 121 during normal operation.

If any LED becomes shorted such that its anode is shorted to its cathode, the shorted LED will stop emitting light, but can still provide a current path for the remaining series-connected LEDs to emit light, thus violating some vehicle regulations. In the circuit 100, shorting of one or more of LEDs 107, 109, 111 will cause its associated sensor to act as a closed switch and provide a HIGH input to status detector 119, which implements a logic OR function to cause a HIGH value status signal at output 121. This change in the status signal indicates that the LED unit has a failed LED and may be used to initiate any fault sequence, such as turning off current source 101 to ensure that the LED unit does not emit any light as is required by some vehicle lighting regulations.

Figure 2:
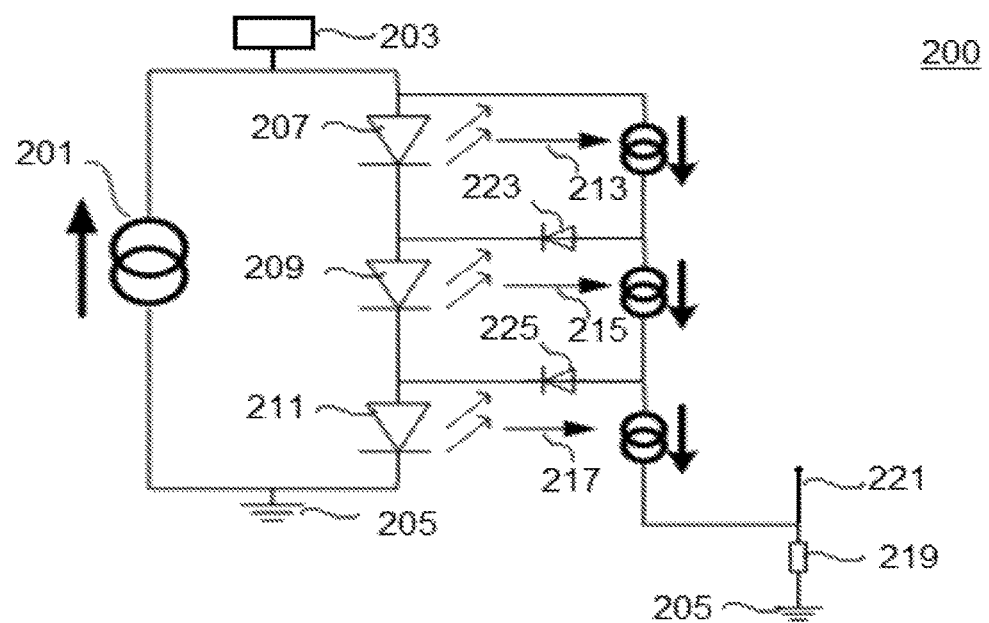
FIG. 2 illustrates a functional block diagram of an individual LED short circuit detection circuit implemented by an AND logic function according to one embodiment.

FIG. 2 illustrates a block diagram of an individual LED short circuit detection circuit implemented by an AND logic function according to one embodiment. As seen, the circuit 200 includes a current source 201 that provides current to an LED unit which includes LEDs 207, 209 and 211. More specifically, LEDs 207, 209, 211 are series connected with the anode of LED 207 connected to an LED voltage 203 and the cathode of LED 211 connected to ground 205. LEDs 207, 209 and 211 are associated with individual LED sensors 213, 215 and 217 respectively. In the embodiment of FIG. 2, the LED sensors 213, 215 and 217 are each schematically represented by a sense arrow coupled to a current source. As seen, the current sources of the sensors are connected in series to provide a current path from LED voltage 203 to ground 205 through resistor 219 which acts as a detector providing a status output 221 representative of an operational status of the LED unit. The status detector 219 is capable of detecting a short circuit of any individual LED within the LED unit.

In the embodiment of FIG. 2, the detector output 221 will transition if any LED 207, 209 or 211 fails by a short circuit from the LED's cathode to anode. FIG. 2 shows the lighting circuit 200 in normal operation. Specifically, when the LEDs 207, 209 and 211 are all operating normally (neither open nor short circuited), their respective sensors 213, 215 and 217 act as series connected current sources to provide a current path from LED voltage 203 to ground 205. This may be seen as a logic AND function where the current source inputs are all HIGH, for example, to activate the current sources and complete the path from LED voltage 203 to ground 205. This current causes a voltage drop across resistor 219 causing the status output 221 to be HIGH in normal operation, for example.

If any LED becomes short circuited, the shorted LED will stop emitting light, but can still provide a current path for the remaining series connected LEDs to operate normally, thus violating vehicle regulations. However, in the circuit 200, shorting of one or more of LEDS 207, 209, 211 will cause the associated sensor to deactivate the current source to interrupt the current path through resistor 219, thus changing the detector output 221 to a logic LOW value. This change in the status signal indicates that the LED unit has a failed LED. The status signal may be used to initiate any fault sequences such as turning off current source 201 to ensure that the vehicle lighting unit complies with regulations. Diodes 223 and 225 ensure that the current source of a sensor is disabled when the related LED is shorted, as will be discussed further in the example of FIG. 3 below.

Figure 3:
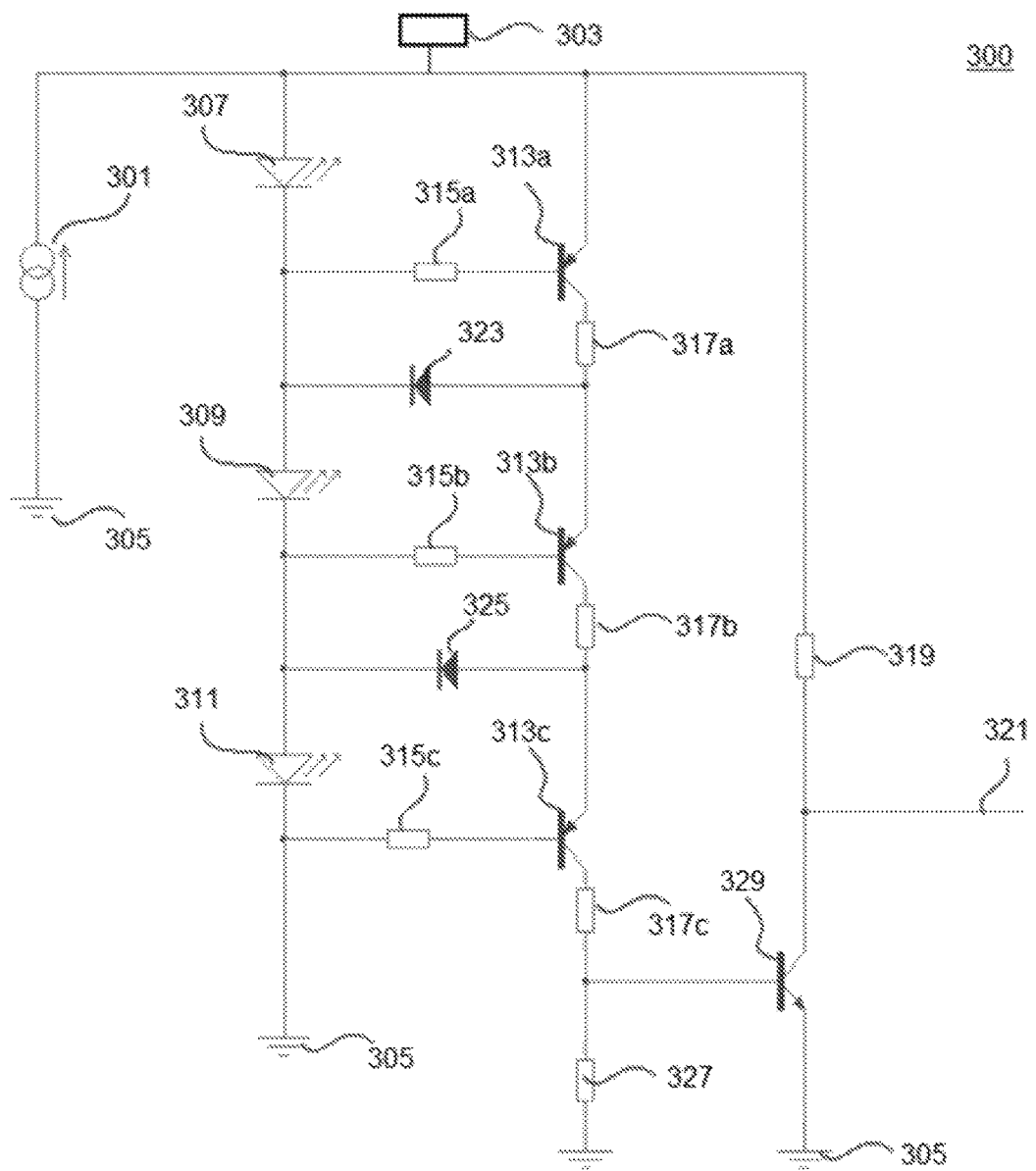
FIG. 3 illustrates a detailed electrical schematic diagram of an individual LED short circuit detection circuit according to one embodiment.

FIG. 3 illustrates a detailed electrical schematic diagram of an individual LED short circuit detection circuit according to one embodiment. As seen, the circuit 300 includes a current source 301 connected between LED voltage 303 and ground 305 to provide current to an LED lighting unit including LEDs 307, 309 and 311 which are connected in series between LED voltage 303 and ground 305. Each LED 307, 309 and 311 is associated with an individual LED sensor for sensing short circuit of a respective LED. For example, LED 307 is associated with an LED sensor including PNP transistor 313a and related base resistor 315a and collector resistor 317a. Resistors 315a and 317a have a resistance value to ensure that transistor 313a is ON during normal operation of the LED 307. LED 309 has a similar LED sensor including transistor 313b, and resistors 315b and 317b, and LED 311 has a similar sensor including transistor 313c, and resistors 315c and 317c. Diodes 323 and 325 ensure that a transistor 313a, 313b and 313c is OFF when a related LED is shorted.

Circuit 300 further includes a status output 321, which transitions from low to high value to indicate a fault when one or more of the LEDs 307, 309 or 311 become shorted. The signal value of output 321 is determined by operation of NPN transistor 329 which is biased by collector resistor 319 and base resistor 327. As seen in FIG. 3, transistors 313a, 313b and 313c are connected in series to provide a current path from LED voltage 303 to ground 305 through resistor 327 the voltage drop of which provides a control output to NPN transistor 329. This may be considered an AND function detector in that all of the transistors 313a, 313b and 313c must be ON to turn ON transistor 329.

In normal operation of circuit 300, LEDs 307, 309, 311 each emit light and provide a voltage divider network to drive respective transistors 313a, 313b and 313c ON. The current path provided by the series connected transistors causes a voltage drop across resistor 327, which provides a base voltage to drive NPN transistor 329 ON. This causes a LOW status signal value at output on 321 during normal operation. If any LED 307, 309, 311 becomes shorted, its associated transistor turns OFF to interrupt the current path provided by the series transistors 313a, 313b, 313c, which causes NPN transistor 329 to turn OFF and the status signal value at output 321 to become a HIGH value which may be used as a control signal to initiate any fault sequence of the vehicle or lighting module.

As a specific example, where LED 307 becomes shorted, PNP transistor 313a is turned OFF due to the base and emitter being at the same potential (i.e., LED voltage 303). Similarly, where LED 309 becomes shorted, PNP transistor 313b is turned OFF due to the base and emitter being essentially at the same potential. In one example, current flow through diode 323 permits a small potential difference of 0.6 v, which is below the turn on threshold for transistor 313b. Diode 325 operates in a similar way to ensure that transistor 313c is OFF when LED 311 is shorted.

Thus, short circuit of any LED 307, 309 or 311 will interrupt the current path through the series connected transistors 313a, 313b, 313c. Loss of a current path for resistor 327 removes the base voltage on NPN transistor 329, which turns OFF such that output 321 is pulled HIGH through collector resistor 319 to indicate a fault. Shorting of the LED 309 or LED 311 will cause their respective sensors to turn OFF to create a HIGH value at status output 321, which may be used to initiate any fault sequence.

Figure 4:
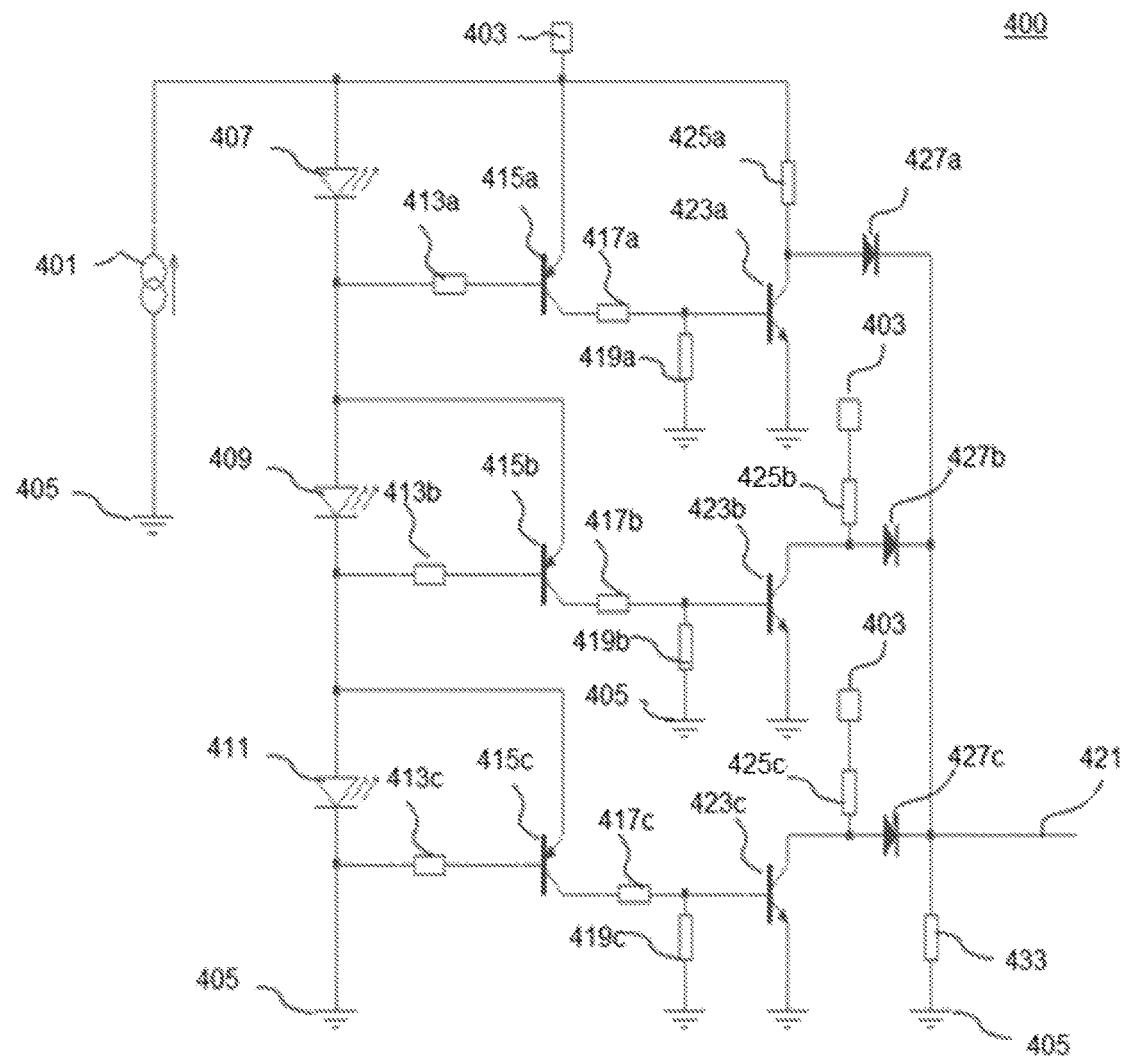
FIG. 4 illustrates a detailed electrical schematic diagram of an individual LED short circuit detection circuit according to one embodiment.

FIG. 4 illustrates a detailed electrical schematic diagram of an individual LED short circuit detection circuit according to one embodiment. As seen, the circuit 400 includes a current source 401 connected between LED voltage 403 and ground 405 to provide current to an LED lighting unit including LEDs 407, 409 and 411 which are connected in series between LED voltage 403 and ground 405. Each LED 407, 409 and 411 is associated with an individual LED sensor for sensing short circuit of a respective LED. For example, the sensor circuit associated with LED 407 includes a PNP transistor 415a, as well as base resistor 413a and collector resistor 417a associated with the transistor 415a. An output of PNP transistor 415a drives NPN transistor 423a having a base resistor 419a and collector resistor 425a associated therewith. Resistance values of the resistors 413a, 417a, 419a and 425a are selected such that PNP transistor 415a and NPN transistor 423a are ON during normal operation of LED 407. LED 409 has a similar sensor circuit including transistors 415b and 423b, as well as resistors 413b, 417b, 419b and 425b. LED 411 has a similar sensor circuit including transistors 415c and 423c, as well as resistors 413c, 417c, 419c and 425c.

As seen, the sensor circuits are provided in parallel with one another and provide a common circuit detector output 421. A collector terminal of each of the NPN transistors 423a, 423b, 423c is connected to respective diodes 427a, 427b and 427c, the cathodes of which are connected to ground 405 through resistor 433. Status output 421 transitions from LOW to HIGH value to indicate a fault when one or more of LEDs 407, 409, 411 becomes shorted.

In normal operation of circuit 400, LEDs 407, 409, 411 each emit light and provide a voltage divider network to drive respective transistors 415a, 415b and 415c ON. The current path provided by each of these transistors provides a base voltage to drive respective NPN transistors 423a, 423b, and 423c ON. This causes diodes 427a, 427b and 427c to be reverse biased, causing a LOW status signal value at output on 421 during normal operation. If any LED 407, 409, 411 becomes shorted, its associated PNP transistor turns OFF to interrupt the current path through its collector voltage divider network causing associated NPN transistor to turn OFF to forward bias the associated output diode. Forward bias of any diode 427a, 427b or 427c causes the status signal value at output 421 to become a HIGH value, which may be used as a control signal to initiate any fault sequence of the vehicle or lighting module.

As a specific example, where LED 407 becomes shorted, PNP transistor 415a is turned OFF due to the base and emitter being at the same potential (i.e., LED voltage 403). This interrupts the current path through the voltage divider network 417a and 419a to remove the base voltage from NPN transistor 423a, putting transistor 423a in an OFF state and removing ground from the anode of diode 427a. Diode 427a then becomes forward biased to pull the status output 421 to a HIGH value. Short circuit of LED 409 or 411 will cause similar operation of their respective sensor circuitry to transition the output 421 to HIGH value, which may be used as a control signal to initiate any fault sequence of the vehicle or lighting module.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A light source failure detection circuit for monitoring a plurality of light sources, comprising at least two circuit paths that are arranged in parallel and in connection with an indicator resistor, each of the at least two circuit paths comprising:
   a first transistor that functions as a first switch and is controllable by a voltage on one of the plurality of light sources to be in an on or off state;
   a voltage divider circuit connected between the first switch and a ground, receiving a current controlled by the first switch, and providing an input voltage to a second transistor functioning as a second switch;
   a resistor connected in series with the second transistor, wherein the resistor and the second transistor connected between a supply voltage and the ground; and
   a diode, wherein an anode of the diode receives a current from a node between the resistor and the second transistor, and an cathode of the diode outputs a current to the indicator resistor,
   wherein a voltage drop on the indicator resistor above a threshold indicates one of the plurality of light sources is shorted.

2. The light source failure detection circuit of claim 1, wherein the plurality of light sources are connected in series or in parallel.

3. The light source failure detection circuit of claim 1, wherein the first or second transistors include a bipolar transistor.

4. The light source failure detection circuit of claim 1, wherein the plurality of light sources include a light emitting diode (LED).

5. An exterior vehicle lighting device, comprising the light source failure detection circuit of claim 1.

6. A motor vehicle, comprising the exterior vehicle lighting device of claim 5.

7. A light source failure detection circuit for monitoring a series of light sources arranged between a current source and a ground, comprising:
   a series of transistors each corresponding to one of the series of the light resources, each transistor functioning as a switch controllable by a voltage on the respective light source to be in an on or off state, each transistor followed by a first resistor;
   an indicator resistor, wherein the transistors, first resistors, and the indicator resistor are connected in series forming a current path that is connected between the current source and the ground;
   a plurality of second resistors each corresponding to one of the series of transistors, each second resistor having a first end and a second end, each second end in connection with a base or a gate of the respective transistor, each first end, except that of the second resistor corresponding to the last transistor, in connection with a first node between the respective light source and the next light resource, the first end of the second resistor corresponding to the last transistor in connection with the ground; and
   one or more diodes each corresponding to one of the series of transistors except the last transistor, wherein an anode of each diode receives a current from a second node between the first resistor following the respective transistor and the next transistor, and an cathode of each diode is in connection with the first node between the respective light resource and the next light resource,
   wherein a voltage drop on the indicator resistor below a threshold indicating at least one of the series of light sources is shorted.

8. The light source failure detection circuit of claim 7, further comprising an output stage connected between a supply voltage and the ground, the output stage comprising:
   a third resistor and a transistor connected in series, wherein the transistor functions as a switch controlled be the voltage drop on the indicator resistor, and an output voltage of the transistor when the transistor is turned off indicates at least one of the series of light sources is shorted.

9. The light source failure detection circuit of claim 7, wherein the transistors include a bipolar transistor.

10. The light source failure detection circuit of claim 7, wherein the series of light sources include a light emitting diode (LED).

11. An exterior vehicle lighting device, comprising the light source failure detection circuit of claim 7.

12. A motor vehicle, comprising the exterior vehicle lighting device of claim 11.

* * * * *